US009800765B2

(12) United States Patent
Gondek et al.

(10) Patent No.: US 9,800,765 B2
(45) Date of Patent: Oct. 24, 2017

(54) PRINTER CARTRIDGES AND MEMORY DEVICES CONTAINING COMPRESSED MULTI-DIMENSIONAL COLOR TABLES

(71) Applicant: HEWLETT-PACKARD DEVELOPMENT COMPANY, L.P., Houston, TX (US)

(72) Inventors: Jay S. Gondek, Camas, WA (US); Stephen J. Nichols, Vancouver, WA (US); Jefferson P. Ward, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/432,064

(22) Filed: Feb. 14, 2017

(65) Prior Publication Data

US 2017/0151801 A1    Jun. 1, 2017

Related U.S. Application Data

(63) Continuation of application No. PCT/US2015/031170, filed on May 15, 2015.

(51) Int. Cl.
*H04N 1/60* (2006.01)
*G06K 15/02* (2006.01)
(Continued)

(52) U.S. Cl.
CPC ........ *H04N 1/6019* (2013.01); *B41J 2/17546* (2013.01); *G03G 15/0863* (2013.01);
(Continued)

(58) Field of Classification Search
CPC ............. H04N 1/6019; G06K 15/1878; B41J 2/17546; G03G 15/0863; G03G 21/1878; G03G 21/1889
See application file for complete search history.

(56) References Cited

U.S. PATENT DOCUMENTS 5,644,509 A    7/1997   Schwartz
5,748,176 A *  5/1998   Gondek .............. H04N 1/6019
                                              345/600
(Continued)

FOREIGN PATENT DOCUMENTS

TW            393409 B1    6/2000
TW         201505861 A     2/2015
(Continued)

OTHER PUBLICATIONS

Ricardo L. De Queroz; On Independent Color Space Transformations for the Compression of CMYK Images; Oct. 1999.
(Continued)

*Primary Examiner* — Scott A Rogers
(74) *Attorney, Agent, or Firm* — Fabian VanCott

(57) ABSTRACT

In one example in accordance with the present disclosure a printer cartridge and memory device containing a representation of a compressed multi-dimensional color table is described. The color table includes at least one low dimensional portion of the multi-dimensional color table storing color transformation information at a first resolution and a number of remaining portions of the multi-dimensional color table storing color transformation information at a second resolution. In the color table, the first resolution is greater than the second resolution and the at least one compressed multi-dimensional color table is to generate a high resolution uncompressed multi-dimensional color table the high resolution being at least as great as the first resolution.

19 Claims, 7 Drawing Sheets

(51) Int. Cl.
 B41J 2/175 (2006.01)
 G03G 21/18 (2006.01)
 G03G 15/08 (2006.01)
(52) U.S. Cl.
 CPC ..... *G03G 21/1878* (2013.01); *G03G 21/1889* (2013.01); *G06K 15/1868* (2013.01); *G06K 15/1878* (2013.01); *H04N 1/6072* (2013.01); *H04N 1/6097* (2013.01)

(56) References Cited

U.S. PATENT DOCUMENTS

| | | | |
|---|---|---|---|
| 5,982,990 A | 11/1999 | Gondek | |
| 5,995,653 A * | 11/1999 | Reed | H04N 1/6072 382/162 |
| 6,137,495 A | 10/2000 | Gondek | |
| 6,559,982 B1 | 5/2003 | Gondek | |
| 6,760,122 B1 | 7/2004 | Gondek | |
| 6,853,468 B2 | 2/2005 | Miller | |
| 6,972,868 B1 | 12/2005 | Gondek | |
| 7,259,798 B2 * | 8/2007 | Lee | H04N 1/6008 345/552 |
| 7,259,890 B2 | 8/2007 | Jeran | |
| 7,450,267 B2 * | 11/2008 | Ito | H04N 1/6058 345/600 |
| 7,471,415 B2 * | 12/2008 | Ito | H04N 1/6058 358/1.9 |
| 7,474,438 B2 | 1/2009 | Gondek | |
| 7,551,321 B2 | 6/2009 | Jeran | |
| 7,652,806 B2 * | 1/2010 | Schweid | G06T 11/001 345/589 |
| 7,756,346 B2 * | 7/2010 | Falk | G06F 3/13 345/589 |
| 8,213,729 B2 * | 7/2012 | Kajiwara | H04N 1/64 382/233 |
| 8,249,340 B2 * | 8/2012 | Monga | H04N 1/46 382/166 |
| 8,294,953 B2 | 10/2012 | Shaw | |
| 8,441,691 B2 * | 5/2013 | Mestha | H04N 1/6025 358/1.2 |
| 2002/0172431 A1 | 11/2002 | Atkins | |
| 2003/0025939 A1 | 2/2003 | Jeran et al. | |
| 2003/0043391 A1 | 3/2003 | Childs | |
| 2003/0043424 A1 | 3/2003 | Bhaskar | |
| 2004/0252131 A1 | 12/2004 | Gondek | |
| 2005/0035984 A1 | 2/2005 | Walmsley | |
| 2005/0179928 A1 | 8/2005 | Ohta | |
| 2007/0115506 A1 | 5/2007 | Yada | |
| 2007/0195342 A1 | 8/2007 | Sugiura | |
| 2010/0085605 A1 | 4/2010 | Shaw et al. | |
| 2010/0157339 A1 * | 6/2010 | Yamada | G03G 15/0863 358/1.9 |
| 2010/0220926 A1 | 9/2010 | Monga et al. | |
| 2015/0103902 A1 | 4/2015 | Li et al. | |
| 2016/0112606 A1 * | 4/2016 | Gondek | H04N 1/6019 358/1.9 |

FOREIGN PATENT DOCUMENTS

| | | |
|---|---|---|
| WO | WO2006081253 A2 | 8/2006 |
| WO | WO2015016860 A1 | 2/2015 |
| WO | WO2015042432 A1 | 3/2015 |

OTHER PUBLICATIONS

Balaji et al; Preprocessing Methods of Improved Lossless Compression of Color Look-Up Tables; Journal of Imaging Science and Technology; SPIE—The International Society for Optical Engineering, US; vol. 52, No. 4; Jul. 22, 2008; pp. 40901-1, XP002722767.

* cited by examiner

PRINTER CARTRIDGES AND MEMORY DEVICES CONTAINING COMPRESSED MULTI-DIMENSIONAL COLOR TABLES

BACKGROUND

Many output devices such as ink printers and laser printers implement a subtractive color model while input devices such as computer monitors, mobile phones, and other input devices implement an additive color model. For example, output devices may use a CMYK (cyan, magenta, yellow and black) color model, while input devices may use a RGB (red, green and blue) color model. To output data from an input device such as a graphic, text or a combination thereof, output devices convert the additive color model into a subtractive color model.

BRIEF DESCRIPTION OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

Figure 1:
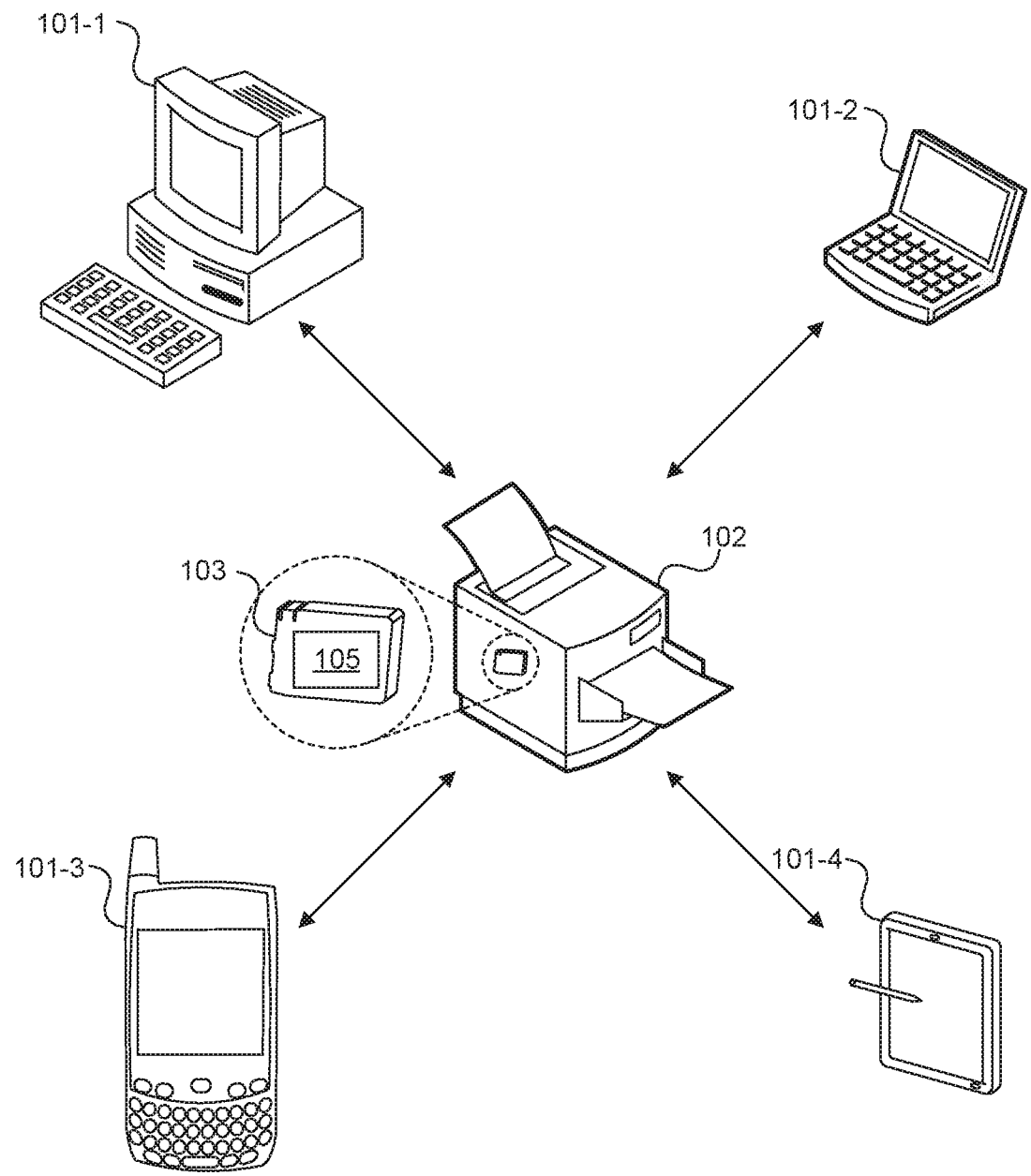
FIG. 1 is a diagram of input devices, an output device, and a printer cartridge containing compressed multi-dimensional color tables, according to one example of the principles described herein.

Input devices may implement one color model, such as an additive color model to visually display text or images. For example, an input device may implement an RGB color model. An input device may implement various types of RGB color models. Examples of RGB color models include sRGB, Adobe® RGB and scan RGB. As used herein, the various types of RGB color models may be referred to generically as an RGB color model, or similar terminology.

Before an input image can be printed as a physical output, the input color model (RGB, for example) is converted to an output color model (CMYK, for example). This may be done using a color transformation table that includes color transformation information used by a processor to convert input color data, such as RGB color data into output color data, such as CMYK color data.

However, current color transformation processes may produce unsatisfactory results. For example, the content of the color transformation from one model to another model is highly dependent on the output media formulation. Still further, the color transformation may be dependent on fluid properties of the ink, the ink's reflective properties when printed on various substrates, and other inherent properties of the ink or toner. Similar principles may apply to other colorants such as toner. As a result, different cartridges, and different ink types may output different representations of input color.

Moreover, uncompressed color tables occupy a lot of space on a memory device, which is exacerbated when the color table is to be stored on a printer cartridge, where space is at a premium. This effect is further compounded as an output device may rely on a number of color transform tables which can be large and take up valuable memory space. Accordingly, reducing the space on a memory device occupied by a color table reduces the size of the memory device or frees up space on the memory device for other storage needs.

Accordingly, the present disclosure describes a memory device that includes a compressed multi-dimensional color table. The memory device may be for use with, or disposed on a printer cartridge. For example, the memory device contains a number of compressed multi-dimensional color tables. A compressed multi-dimensional color table includes low dimensional portions that contain color transformation information stored at a higher resolution. Remaining portions of the compressed multi-dimensional color table, such as higher dimensional representations contain color transformation information stored at a lower resolution, relative to the higher resolution.

A compressed multi-dimensional color table that encodes low dimensional data at higher resolutions and remaining data at lower resolutions provides compact storage of color transformation information while maintaining a higher resolution for certain portions of a color table. Moreover, the compressed color table stored on the memory device will enable for perceptually lossless compression of color tables at significant compression rates. Accordingly, the compressed color table allows for lossless compression results while meeting the storage allocation of a memory device of a printer cartridge. The portions of the multi-dimensional color table that are stored at higher resolutions may reflect an intended use of the color table. For example, the compressed multi-dimensional color table may preserve portions of the color table that correspond to colors that are most susceptible to error perception by the human eye, thus increasing the overall quality of the compressed color table. More specifically, portions of a color table that are near the neutral axis (i.e., a line between black and white in a color table), that may be referred to as shades of gray, skin-toned or earth-toned colors may be desired to be stored at a higher resolution. In this example, a compressed multi-dimensional color table allows for more accuracy in these neutral, gray, skin-toned, or earth-toned portions, and greater compression in interpolated or predicted data points where increased resolution may not be needed all while maintaining a lossless overall transformation. In another example, for example the printing of a corporate logo, greater compression may be desirable in the neutral, gray, skin-toned, or earth-toned portions while maintaining greater resolution for colors used in the corporate logo. In yet another example, more accuracy may be desired in corporate logo colors in addition to the neutral colors. In other words, the present disclosure describes a data structure that compresses each colorant more efficiently.

Still further, including the color transformation information on a memory device of the printer cartridge allows for printer cartridge specific information to be stored, rather than generic color transformation information that is stored on a printer or a printer driver. For example, a compressed multi-dimensional color table stored on a memory device of a printer cartridge, removes the color tables from a printer or other electronic device. The color table is optimized for the inks in the cartridge. For example, updates and adjustments to the color tables would not include pushing table updates via a printer program instruction or a printer driver update. Additionally, a memory device that comprises a representation of the compressed color table, such as the color table or a pointer, affords greater flexibility and customization in the selection and use of various printer cartridges.

Still further, compressing the color table may reduce the amount of memory used to store information. For example, an uncompressed 17-cubed RGB-indexed CMYK-output color table uses 19,562 bytes of storage. By comparison a compressed multi-dimensional color table described herein, with a higher resolution portion such as the neutral axis that has 17 nodes along its length and the rest of the color table having 5 nodes along the axes uses less bytes of storage. Removing the redundant nodes, the compressed multi-dimensional table with higher resolution low dimensional portions and lower resolution high dimensional portions uses 548 bytes. These 548 bytes are accounted for as follows: 17 bytes corresponding to the nodes along the neutral axis plus $5^3$ bytes less 5 bytes of the redundant nodes, the $5^3$ less 5 corresponding to the remaining portions. While the application makes references to 5-node resolution and 17-node resolution, any level of resolution may be used in accordance with the present specification, including 3-node resolution, 33-node resolution, and even up to 256-node resolution.

For example, the present specification describes a printer cartridge that includes a memory device and at least one compressed multi-dimensional color table stored on the memory device. The compressed multi-dimensional color table includes at least one low dimensional portion of the multi-dimensional color table storing color transformation information at a first resolution and a number of remaining portions of the multi-dimensional color table storing color transformation information at a second resolution; the first resolution being greater than the second resolution. The multi-dimensional color table is to generate a high resolution uncompressed multi-dimensional color table, the high resolution being at least as great as the first resolution.

The present specification also describes a memory device that includes at least one compressed multi-dimensional color table. The compressed multi-dimensional color table includes a first number of nodes along a low dimensional portion of the multi-dimensional color table storing color transformation information at a first resolution and a second number of nodes along a number of remaining portions of the multi-dimensional color table storing color transformation information at a second resolution; the first resolution being greater than the second resolution. The multi-dimensional color table is to generate a high resolution uncompressed multi-dimensional color table, the high resolution being at least as great as the first resolution.

The present specification also describes a memory device that includes a representation of at least one compressed multi-dimensional color table. The compressed multi-dimensional color table includes a first number of nodes along a low dimensional portion of the multi-dimensional color table. The first number of nodes store color transformation information at a first resolution. The compressed multi-dimensional color table also includes a second number of nodes along a number of remaining portions of the multi-dimensional color table. The second number of nodes store color transformation information at a second resolution; the first resolution being greater than the second resolution. The multi-dimensional color table is to generate a high resolution uncompressed multi-dimensional color table, the high resolution being at least as great as the first resolution.

As used in the present specification and in the appended claims, the term "multi-dimensional color table" or similar language refers broadly to a color table that includes color transformation information at various dimensions. For example, a color table may be three-dimensional and visualized as a cube with each axis pertaining to an input color value. In one example, an RGB color transform cube may include nodes that are indexed by R, G, and B values, with each R, G, B color component representing an input dimension in the 3-dimensional RGB color transform. The multi-dimensional color table may be sub-divided into a number of smaller dimensional representations.

Still further, as used in the present specification and in the appended claims a "low dimensional" or "lower dimensional" portion or similar language refers broadly to a portion of the multi-dimensional color table that is less than the full dimension of the color table. For example, given a three-dimensional color table, a lower dimension, or lower dimensional portion may refer to a planar section of the cube, i.e., a 2D portion, or a linear section of the cube connecting two points within the cube, i.e., a 1D portion. Still further, a "remaining portion" or similar language refers broadly to a portion of the multi-dimensional color table that is not identified as lower-dimensional or intermediate dimensional.

Still further, as used in the present specification and in the appended claims, "neutral color" may refer to those colors that are near the neutral axis. Examples of neutral colors include shades of gray, earth-toned colors, and skin-toned colors.

Still further, as used in the present specification and in the appended claims, "color difference" may refer to the difference in color values of adjacent nodes in an uncompressed color table. For examples, node-pairs along the neutral axis, or node-pairs near the neutral axis such as skin-toned colors, may have smaller color value differences relative to node-pairs that are farther away from the neutral axis.

Still further, in the present specification and in the appended claims, the term "lossless compression," or similar language, refers broadly to compression wherein the original data, is reconstructed from the compressed data, such that the differences between the original data and the compressed data are imperceptible. In one example, "digitally lossless compression" includes compression where there is no digital difference between the original data and the compressed data and "perceptually lossless compression" includes compression where there are digital differences between the original data and the compressed data, but the differences are not visible to the consumer of the data. The low dimensional portions may be digitally losslessly compressed.

Yet further still, in the present specification and in the appended claims, the term "interpolated color table" or similar terminology may include a color table that comprises 1) a number of actual nodes that correspond to nodes from a base color table such as the multi-dimensional color table and 2) a number of interpolated nodes that are interpolated from a base color table using any mathematical interpolation method. The interpolated nodes may include interpolated node values.

Still further, in the present specification and in the appended claims, the term "neutral axis" may include a line extending from the origin of a three-dimensional color table to the node of the color table farthest from the origin. One of the origin node and the farthest node corresponds to the color white, and the other corresponds to the color black. Colors along the neutral axis may be referred to as "neutral colors," "near-neutral colors," or similar terminology and may be those colors where small differences or errors are most accurately discerned by the human eye. Accordingly, deviations along the neutral axis are more easily perceived by the human eye.

Lastly, as used in the present specification and in the appended claims, the term "a number of" or similar language may include any positive number comprising 1 to infinity; zero not being a number, but the absence of a number.

In the following description, for purposes of explanation, numerous details are set forth in order to provide a thorough understanding of the present systems and methods. It will be apparent, however, to one skilled in the art that the present apparatus, systems, and methods may be practiced without these details. Reference in the specification to "an example" or similar language means that a particular feature, structure, or characteristic described is included in at least that one example, but not necessarily in other examples.

FIG. 1 is a diagram of input devices (101-1, 101-2, 101-3, 101-4), an output device (102), and a printer cartridge (103) having a compressed multi-dimensional color table (105), according to one example of the principles described herein. In some examples, via an input device (101) a user may generate data to be output in tangible form. The data may be text, an image, or combinations thereof. In one example of generating input to be physically output, a user uses a word processing computer program on a computer (101-1), laptop (101-2), smart phone (101-3), personal digital assistant (101-4) or other input device (101) to generate a text document. In another example, a user generates, or otherwise obtains a graphic. Examples of input devices (101) include, computers, laptops, digital cameras, mobile devices, personal digital assistants (PDAs), tablets; and other input devices. An output device (102) may be used to output a physical version of the generated data. For example, a printer may print the text document or the graphic onto paper. Examples of output devices (102) include laser printers and ink printers.

A printer cartridge (103) may be used with an output device (102) to generate a physical output based on information received from an input device (101). For example, the printer cartridge (103) may be an ink cartridge that contains liquid ink for use with an inkjet printer. In another example, the printer cartridge (103) may be a toner cartridge that contains dry toner powder for use with a laser printer. In one example, the printer cartridge (103) is a three-dimensional printer cartridge (103) such that the printer cartridge (103) can be used for three-dimensional printing. As will be described below, the printer cartridge (103) may comprise a number of compressed color tables, or representations of a number of compressed color tables that convert an input device (101) color model to an output device (102) color model.

The printer cartridge (103) includes a compressed multi-dimensional color table (105). The multi-dimensional color table (105) includes portions that are stored at a higher resolution and portions that are stored at a lower resolution. The multi-dimensional color table (105) may be compressed as some of the information is stored at a lower resolution, and therefore smaller size. In other words, if all the entries of the multi-dimensional color table (105) were stored at a higher resolution, then the multi-dimensional color table (105) would not be a compressed color table.

In some examples, a number of printer cartridges (103) may be used with an output device (102) to generate an output. For example, when used with an inkjet printer, multiple printer cartridges (103) may be used. More specifically, one printer cartridge (103) may include black ink and another printer cartridge (103) may include cyan, magenta and yellow ink. In another example, one printer cartridge (103) may include black ink, another printer cartridge (103) may include cyan ink, another printer cartridge (103) may include magenta ink, and another printer cartridge (103) may include yellow ink. Accordingly, each printer cartridge (103) may contain a number of compressed color tables corresponding to the ink colors included in the printer cartridge (103). While FIG. 1 depicts a number of input devices (101), and an output device (102), in one example, the present specification is directed to a printer cartridge (103) and memory device containing a compressed color table.

Figure 2:
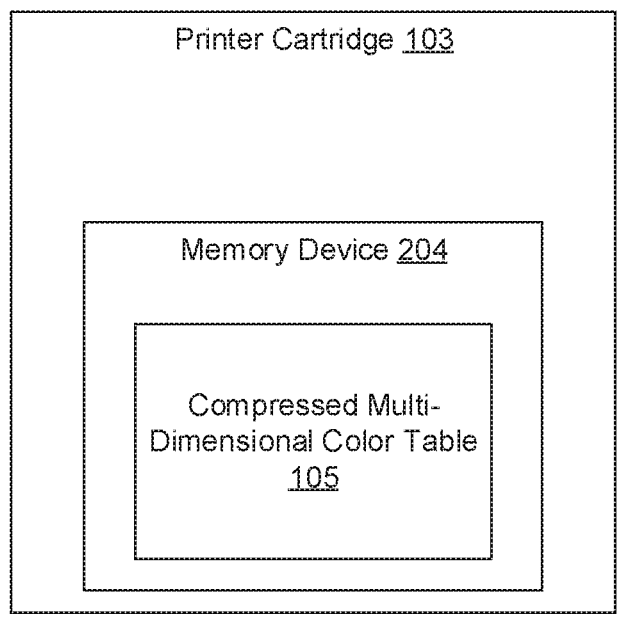
FIG. 2 is a diagram of a printer cartridge with a memory device containing a compressed multi-dimensional color table, according to one example of the principles described herein.

FIG. 2 is a diagram of a printer cartridge (103) with a memory device (204) containing a compressed multi-dimensional color table (105), according to one example of the principles described herein. The memory device (204) stores data relating to the conversion of input data to output data. For example, the memory device (204) may store a number of compressed multi-dimensional color tables (105) that convert an input color model into an output color model. The memory device (204) may be implemented with other electronic components to generate a physical output. For example, the memory device (204) may be coupled to a printer cartridge controller (not shown) that controls the distribution of an output media (e.g., ink or toner) onto a physical substrate. In some examples, a memory device (204) is disposed on the printer cartridge (103). In other examples, the memory device (204) is independent of the printer cartridge (103) and programmed to be used with the printer cartridge (103).

Figure 7:
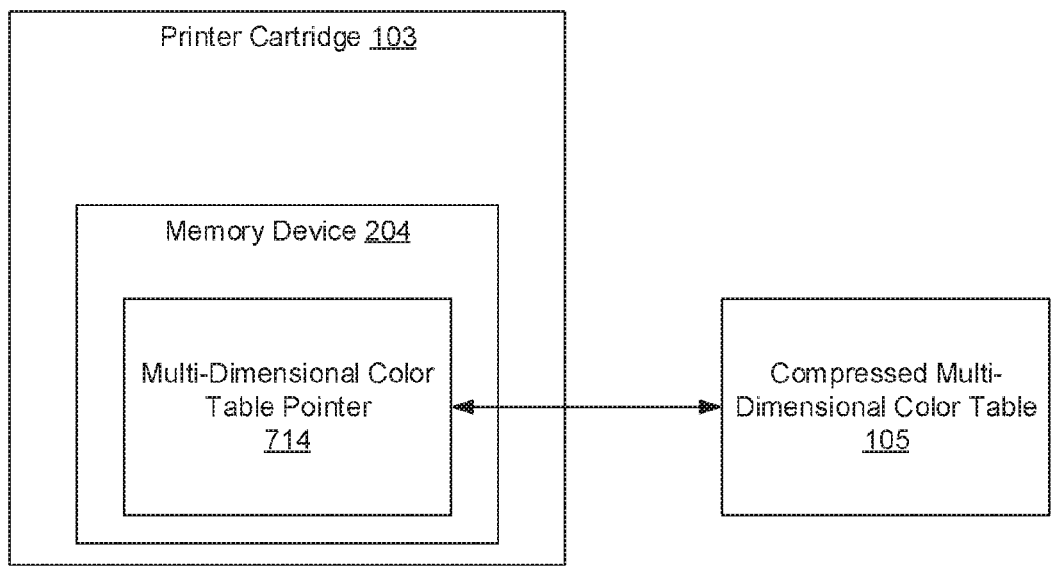
FIG. 7 is a diagram of a printer cartridge with a memory device containing a pointer to a compressed multi-dimensional color table, according to one example of the principles described herein.

As described above, the memory device (204) stores a representation of compressed multi-dimensional color tables (105) that transform received data from an input color model to an output color model. For example, FIG. 2 depicts an example where the representation is the compressed multi-dimensional color table (105) which is stored on the memory device (204) and FIG. 7 depicts an example where the representation is a pointer to the compressed multi-dimensional color table (105). A compressed multi-dimensional color table (105) specifies the transformations of an input model (such as sRGB, adobe RGB, scan RGB, for example) to an output model. For simplicity, the present specification discusses the color transformation with regards to a three-dimensional RGB color model, however the compressed multi-dimensional color tables (105) may convert any number, and any type, of input color models into any number, and any type, of output color models. For example, the multi-dimensional color table may be a four-dimensional CMYK table. Examples of color models that may be converted include, a Specifications for Web Offset Publications (SWOP) CMYK model and the International Commission on Illumination (CIE) L*a*b* color model.

Each compressed multi-dimensional color table (105) includes at least one low dimensional portion that stores color transformation information at a first resolution and a number of remaining portions that store color transformation information at a second resolution, in which the first resolution is greater than the second resolution. For example, low dimension transitions, such as the neutral axis, or other one-dimensional axes within the three-dimensional color table may be stored at a higher resolution (i.e., 17 node resolution) than the rest of the of the three-dimensional color table (105), which for example may be stored at a 5-node resolution. The low dimensional portions may be stored at a higher resolution to preserve the accuracy of the color transformation information thereby increasing the accuracy of these regions.

In some examples, the low dimensional portion, the remaining portions, or combinations thereof may be used by multiple applications. In other words, the low dimensional portion of the multi-dimensional color table (105) may be the same as at least one low dimensional portion of another multi-dimensional color table of another printer cartridge. For example, a single low dimensional higher resolution neutral axis may be stored and used in the creation of several color look-up tables (CLUTs) relative to various paper types and various print qualities. Sharing such information for multiple paper types and multiple paper qualities further reduces the use of memory on a printer cartridge (103).

Storing the compressed multi-dimensional color table (105) or a pointer on a memory device (204) either used with, or disposed on, a printer cartridge (103) allows greater flexibility in output media customization. For example, updates to the color transformation can be distributed via the printer cartridges (103) as opposed to pushing printer program instructions or printer driver updates. Additionally, as the color transformation is heavily dependent on the ink or toner formulation, a more accurate representation of the input color model may be generated when the compressed multi-dimensional color table (105) is tailored to a specific printer cartridge (103) rather than stored on an output device (FIG. 1, 102) that may implement various kinds of printer cartridges (103). Additionally, compressed color tables (105) may be updated as ink or toner formulation changes.

Moreover, including higher resolution low dimensional portions and lower resolution remaining portions of the color table (105) allows for improved memory usage while preserving the quality of certain portions of the color transformation table.

Figure 3:
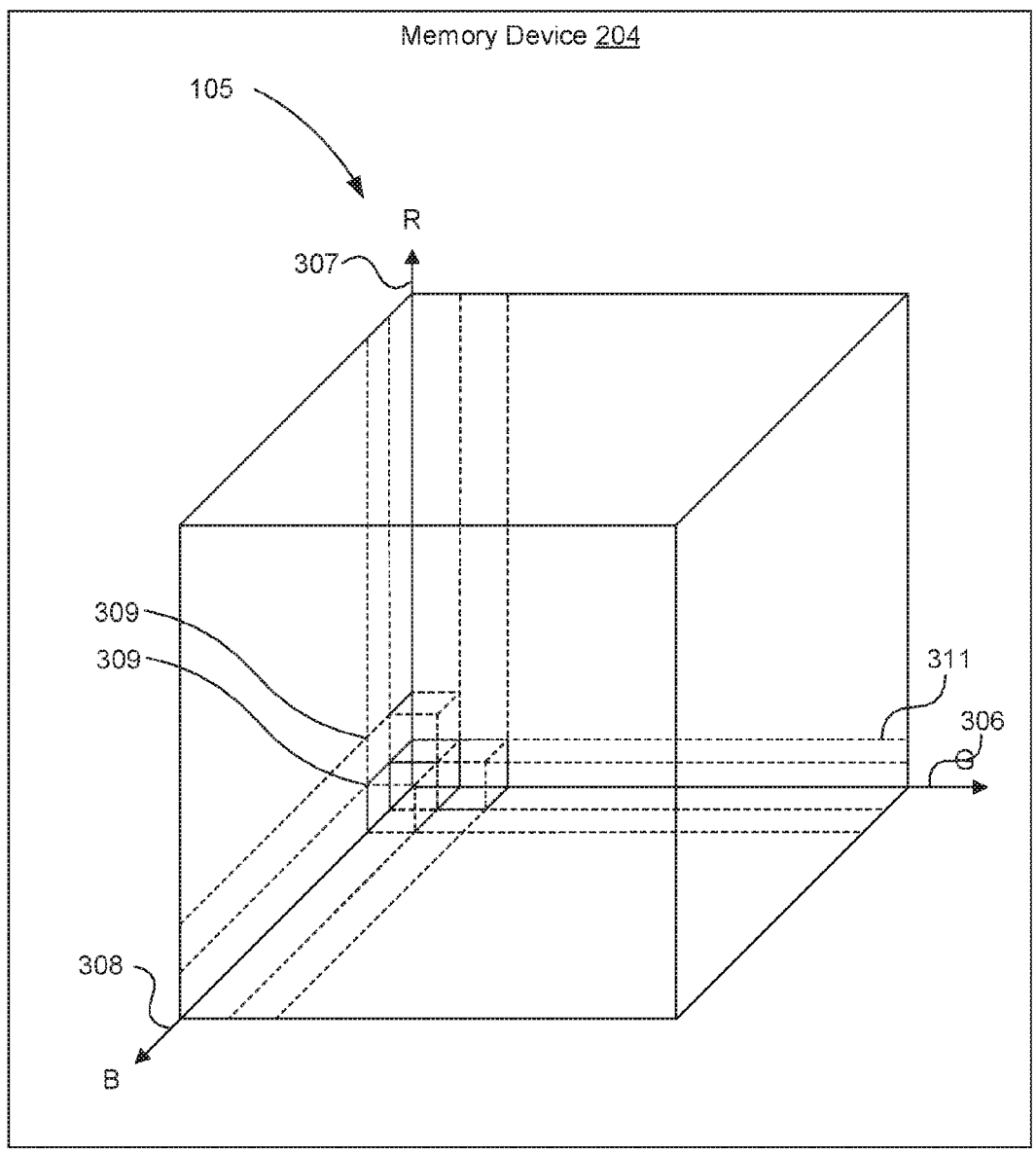
FIG. 3 is a diagram of a memory device with a compressed multi-dimensional color table, according to one example of the principles described herein.

FIG. 3 is a diagram of a memory device (204) with a compressed multi-dimensional color table (105), according to one example of the principles described herein. As described above, in some examples, the compressed multi-dimensional color table (105) may be represented as a three-dimensional cube; each axis of the cube corresponds to a color of the input color model. For example, in an RGB-indexed color table (105), the x-axis (306) may correspond to the color green, the y-axis (307) may correspond to the color red, and the z-axis (308) may correspond to the color blue. A number of lines divide each plane of the cube as indicated in FIG. 3 by the dashed lines (311). For simplicity, in FIG. 3 a single line (311) has been indicated by a reference numeral. The intersection of two lines is designated as a node (309) that indicates a transformation from the input colorant indicated by the index of the node (309) in the cube, to an output colorant indicated by a node value. More specifically, each node (309) is indexed by the input color model colorants (e.g., R, G, B as depicted in FIG. 3) and a node value indicates the output colorant combination that generates an output colorant corresponding to the input colorant for that node (309).

The accuracy of the color transformation depends on the number of nodes (309). In some examples, the accuracy of the color transformation is referred to as the resolution of the color table. For example, a 5-cubed color table generates a less accurate output representation of the input color model. This may be referred to as a lower-resolution color table. By comparison, a 17-cubed color table generates a more accurate output representation of the input color mode. This may be referred to as a higher resolution color table.

As will be described in FIG. 4, the compressed multi-dimensional color table (105) is sub-divided into dimensional portions, each dimensional portion containing a number of nodes (309). The number of nodes in a given dimensional portion defines a resolution of that portion. For example, the compressed multi-dimensional color table (105) includes nodes (309) along a low dimensional portion, which nodes (309) store color transformation information at a first resolution. The multi-dimensional color table (105) also includes nodes (309) along other portions, which nodes (309) store color transformation information at a second, and lower, resolution. As described above, those nodes of other portions, which are not along the low dimensional portion, may be referred to as nodes of a remaining portions. In other words, the compressed multi-dimensional color table (105) may include portions that are at a lower resolution relative to other portions. In a specific numeric example, the compressed multi-dimensional color table (105) includes a one-dimensional portion, such as the neutral axis or other lower dimensional transition that contains 17 points along its length and contains other portions, such as a number of two-dimensional slices of the three-dimensional cube that include 5 nodes along its axes.

In some examples, the resolution of portions of the compressed multi-dimensional color table (105) may be selected based on intended application. For example, differences in vivid colors are less easily perceived by the human eye. Accordingly, nodes (309) corresponding to these vivid colors may have a lower resolution. By comparison, differences in "near-neutral" colors (i.e., colors close to a neutral axis of the cube such as earth-toned colors, skin-toned colors, or shades of gray) may be more easily perceived. Accordingly, nodes (309) corresponding to these near-neutral colors may have a higher resolution.

In another example, the portions of the multi-dimensional color table (105) that are stored at a higher resolution may be those colors having larger color differences between node-pairs relative to the remaining portions as measured by a color difference metric. Such metrics include the International Commission on Illumination (CIE) Delta E metric, CIE76 formula, CIE94 formula, CIEDE2000, and CMC I:c metric. For example, in a corporate logo, it may be desirable to have greater resolution for a color heavily used in the corporate logo, for example, green, whereas it may not be as relevant to have great resolution for earth-toned colors such as brown or beige as such colors may not be present in the corporate logo. In other words, the compressed multi-dimensional color table (105) may include any number of different portions of the table (105) stored at a higher resolution, depending upon, for example, the application.

The compressed multi-dimensional color table (105) may correspond to a particular media type. For example, particular paper types, or particular paper colors may have corresponding compressed multi-dimensional color tables (105). For example, one compressed multi-dimensional color table (105) may correspond to plain paper and another compressed multi-dimensional color table (105) may correspond to thicker paper, such as company letterhead, or bond paper.

In another example, different degrees of output quality may have different compressed multi-dimensional color tables (105). For example, a "draft" quality may have one compressed multi-dimensional color table (105), and a "best" quality may have a different compressed multi-dimensional color table (105). In yet another example, different input devices (FIG. 1, 101) may have different corresponding compressed multi-dimensional color tables (105). For example, a mobile device may have one corresponding compressed multi-dimensional color table (105), and a digital camera may have a different corresponding compressed multi-dimensional color table (105).

Figure 4:
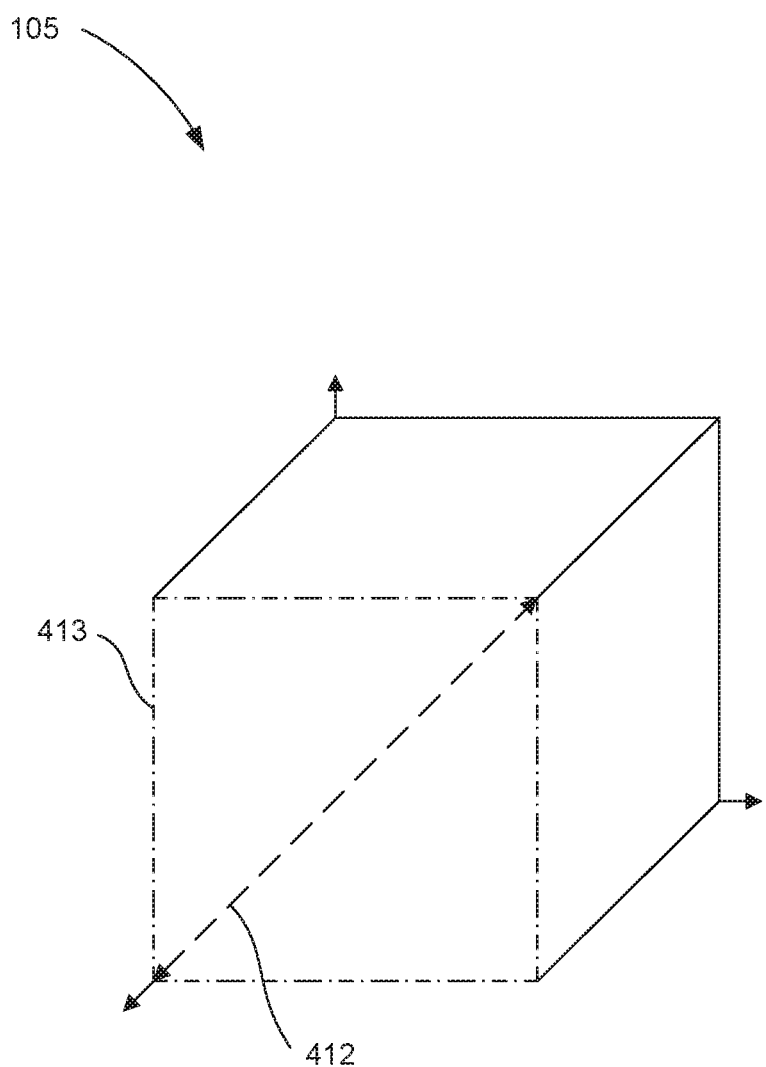
FIG. 4 is a diagram of a compressed multi-dimensional color table, according to one example of the principles described herein.

FIG. 4 is another diagram of a compressed multi-dimensional color table (105), according to one example of the principles described herein. As described above, a color table may be represented by a three-dimensional cube having a number of nodes (FIG. 3, 309). The compressed multi-dimensional color table (105) may be broken up into a number of dimensional representations. For example, a three-dimensional compressed color table (105) may include a number of low dimensional portions. A specific example is a one-dimensional portion (412) of the three-dimensional compressed color table (105). A one-dimensional portion (412) of a compressed multi-dimensional color table (105) may refer to a line connecting two nodes (FIG. 3, 309); all nodes (FIG. 3, 309) along that line being a part of the one-dimensional portion (412). For example, as depicted in FIG. 4, a one-dimensional portion (412) may be a line connecting nodes (FIG. 3, 309) at the lower left hand corner of a front face to the upper right hand corner of the front face. While FIG. 4 specifically depicts one example of a one-dimensional portion (412) the compressed multi-dimensional color table (105) may be made up of a number of one-dimensional portions that connect different points within the color space.

Similarly, a three-dimensional compressed color table (105) may include a number of remaining portions, a remaining portion being a portion that includes nodes not identified as pertaining to the low dimension portion. For example, if a one dimension portion is identified as a low dimension portion, a two-dimensional portion (413) of the three-dimensional compressed color table (105) may be included as a remaining portion. A two-dimensional portion (413) may be a planar slice, face, or other portion defined by two axes of the compressed multi-dimensional color table (105). While reference in FIG. 4 is made to a three-dimension compressed color table (105), a one-dimensional portion (412), and a two-dimensional portion (413), a compressed multi-dimensional color table (105) may include any number of dimensions. For example, the compressed multi-dimensional color table (215) may be a four-dimensional table, such as a table representing a CMYK input color model.

In summary, each compressed multi-dimensional color table (105) is divisible into a number of other dimensions. A low dimension being a dimension less than the full-dimension of the compressed color table (105). For example, in a three-dimensional representation of a color table, when a low dimensional portion may be a one-dimensional portion or a two-dimensional portion, the remaining portion being that portion not defined as a low dimensional portion.

A resolution of a portion of a color table (105) is defined by the number of nodes (309) along a particular axis. For example, a one-dimensional portion with five nodes along its length may be lower resolution than a one-dimensional portion with seventeen nodes along its length. Similarly, a two-dimensional portion with five nodes along its axes may be lower resolution than a two-dimensional portion with seventeen nodes along its axes. The accuracy of the color transformation depends on the number of nodes of the color table. In some examples, the accuracy of the color transformation may be referred to as the resolution of the color table. For example, a 5-cubed color table generates a less accurate output representation of the input color model. This may also be referred to as a low-resolution color table. By comparison, a 17-cubed color table generates a more accurate output representation of the input color mode. This may be referred to as a high-resolution color table.

While FIG. 4 indicates two different resolutions, any number of resolutions may be used in the compressed color table (105). For example, the compressed color table may include a third number of nodes along an intermediate portion of the compressed multi-dimensional color table that store color transformation at a third resolution, which third resolution is the same as or different from the second resolution and first resolution. In other words, the compressed multi-dimensional color table (105) may include any number of portions of nodes that contain color transformation information encoded to any number of different resolution levels. In this example, the high resolution uncompressed color table may be a resolution that is at least as great as the highest of the first resolution and the third resolution.

Figure 5:
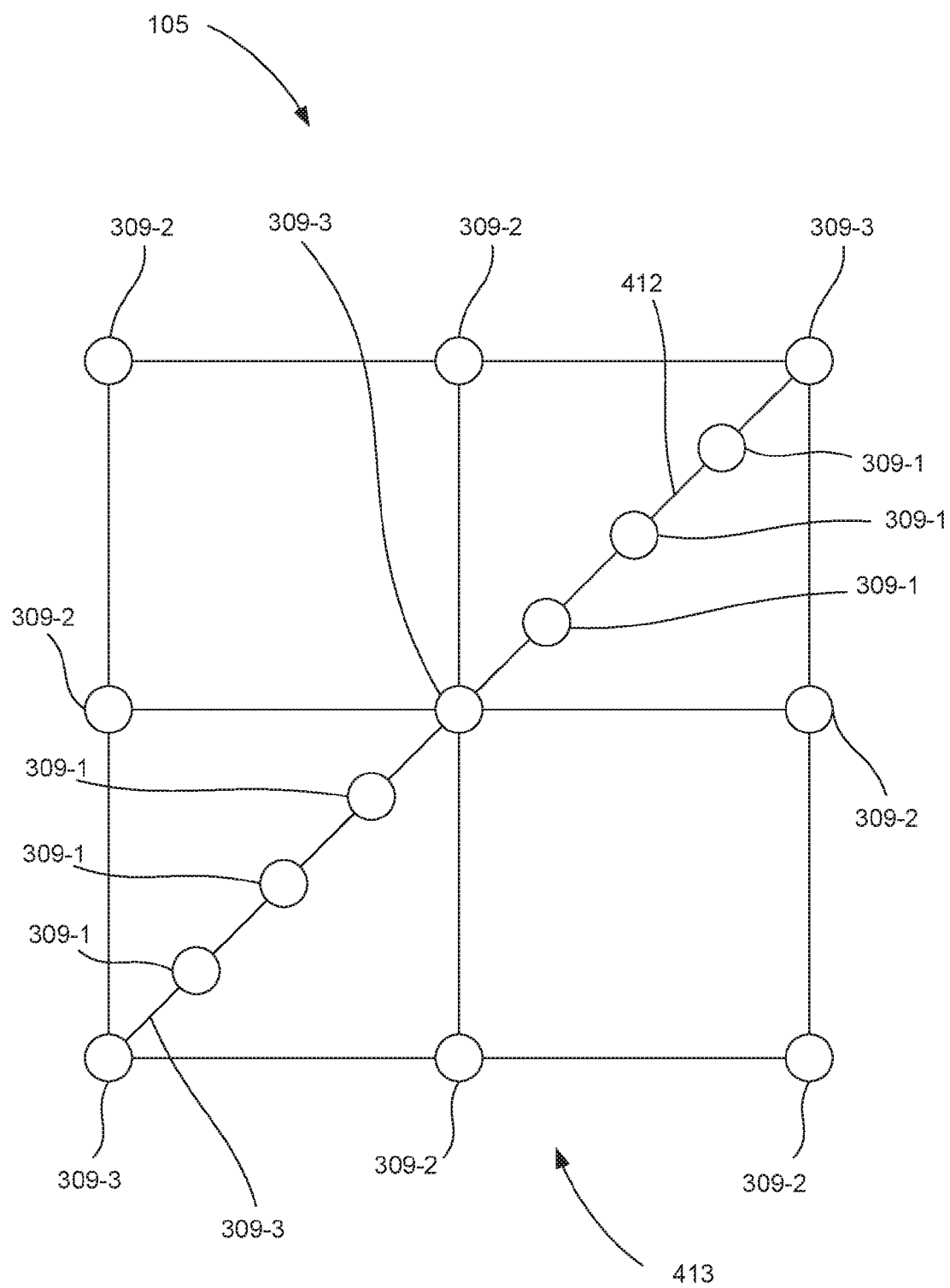
FIG. 5 is a diagram of a plane of a compressed multi-dimensional color table, according to one example of the principles described herein.

FIG. 5 is a diagram of a plane of a compressed multi-dimensional color table (105), according to one example of the principles described herein. For example, FIG. 5 depicts a number of dimensional portions of the compressed multi-dimensional color table (105) at different resolutions. As described above, the compressed multi-dimensional color table (FIG. 1, 105) may include a low dimensional portion that stores color transformation information at a first resolution. For example, as depicted in FIG. 5, the one-dimensional portion (412) of the compressed multi-dimensional color table (105) may have a higher resolution than the two-dimensional portion (413) as indicated by the greater number of nodes (309-1) along the one-dimensional portion (412) as compared to the number of nodes (309-2) along the axes of the two-dimensional portion (413). In a specific numeric example, the one-dimensional portion (412) may have 17 nodes along its length as compared to a two-dimensional plane (413) that may have 5 nodes along its axes. A number of redundant nodes (309-3), that are both part of a one-dimensional portion (412) and a two-dimensional portion (413), are accounted for accounted for one time when determining the total bytes used by a compressed multi-dimensional color table (105).

The compressed multi-dimensional color table (FIG. 1, 105) may have more than one low dimensional portion that is stored at a higher resolution. For example, a neutral axis may have more nodes along its length relative to remaining portions (e.g., two- or three-dimensional portions). At the same time other axes, such as the axis between black and green, black and red, and black and blue among other axes may also store color transformation at the first resolution, having more nodes (309) along their lengths than other, higher dimensional, portions of the compressed multi-dimensional color table (105). Other examples of low dimensional portions that may be stored at higher resolution include transitions from primary colors to secondary colors.

As described above, encoding a compressed multi-dimensional color table (105) to include portions at different resolutions increases memory efficiency by reducing the size of a color table while maintaining those portions that benefit from a more accurate color transformation.

Figure 6:
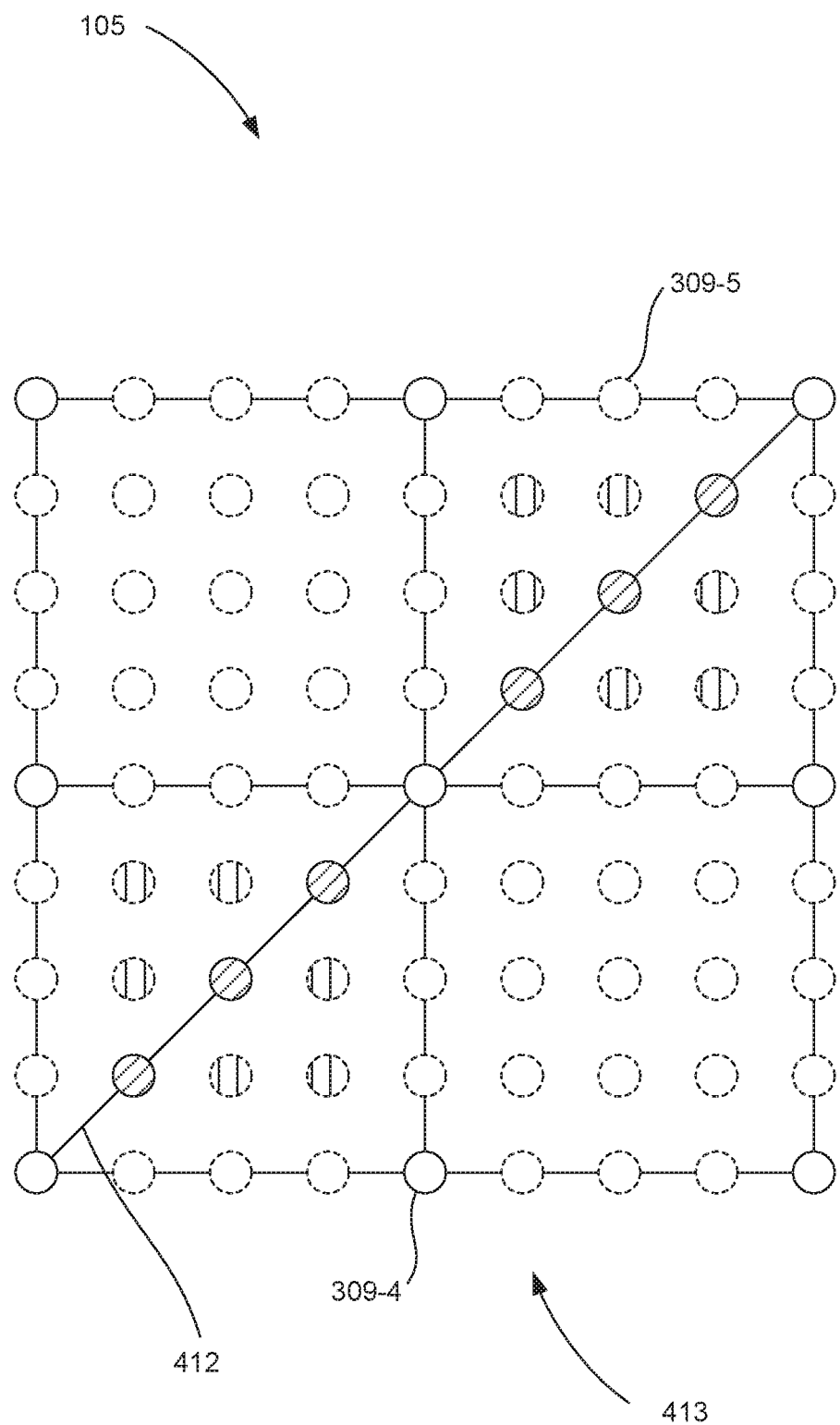
FIG. 6 is a diagram of a plane of a compressed multi-dimensional color table including interpolated nodes, according to one example of the principles described herein.

FIG. 6 is a diagram of a plane of a compressed multi-dimensional color table (105) including interpolated nodes (309-5), according to one example of the principles described herein. The compressed multi-dimensional color table (105) may be used to generate a high resolution uncompressed multi-dimensional color table, the high resolution being at least as great as the highest resolution in the compressed multi-dimensional table (FIG. 1, 105). For example, the low dimensional higher resolution portion (i.e., one-dimensional portion (412)) and the remaining dimensional lower resolution portion (of which the two-dimensional portion (413) may be an example) can, using any form of interpolation, be used to interpolate higher resolution color transformation information. For simplicity, in FIG. 6, all nodes (309-4) that fall along the remaining portion and the low resolution portion that are not interpolated nodes (309-5) are indicated with a solid-line circle. In other words the non-interpolated nodes (309-4) include the redundant nodes (FIG. 3, 309-3), nodes (FIG. 3, 309-1) that fall along the high resolution portion and nodes (FIG. 3, 309-2) that fall along the lower resolution portion. Nodes (FIG. 3, 309-1) that fall along the higher resolution remaining portions are indicated in FIG. 6 as circles having a solid outline and cross-hatched fill. By comparison, the interpolated nodes (309-5), indicated by the dashed circles, may be node values that are interpolated from the non-interpolated nodes (309-4) or other interpolated nodes (309-5). For simplicity a single instance of a non-interpolated node (309-4) and an interpolated node (309-5) are indicated by reference numbers.

Using any interpolation method, the non-interpolated nodes (309-4), i.e., the nodes (FIG. 5, 309-1, 309-2, 309-3) of the higher and lower resolution portions respectively, a high resolution uncompressed multi-dimensional color table is generated.

The multi-dimensional color table (FIG. 1, 105) may include a number of node addresses to individually address nodes within the compressed multi-dimensional color tale (FIG. 1, 105). In some examples, the interpolation and generation of the uncompressed multi-dimensional color table is generated prior to a request. For example, it may be a pre-request process that occurs as the printer cartridge (FIG. 1, 103) is loaded into an output device (FIG. 1, 102). In this example, via simple linear interpolation, interpolated nodes (309-5) are calculated using adjacent non-interpolated nodes (309-4) or other adjacent interpolated nodes (309-5). Accordingly, a full uncompressed color table may be generated prior to any request for an output. Subsequent requests may then rely on the full uncompressed color table.

In some examples, the generation of the high resolution color transformation information may be in response to request to generate an output. In other words, the generation of uncompressed color transformation information may be performed in real time. In this example, rather than uncompressing the entire uncompressed color table, just those portions indicated in the request are decompressed. As each of the nodes are individually addressable, less than all of the nodes may be relied on, the nodes relied on being identified based on the information received in a request.

Using both the higher resolution data and the lower resolution data allows a more accurate color transformation based on the use of the higher resolution data near the lower dimensional portion of the compressed multi-dimensional color table (105). For example, as depicted in FIG. 5, a one-dimensional portion (412) may be a losslessly compressed portion as color changes along this portion are intended to be stored at a higher resolution based on the application. In other words, the one-dimensional portion (412) may include more nodes (309-4), indicated by the solid cross-hatched circles, than a two-dimensional portion (413), nodes (309-4) in the two-dimensional portion (413) are indicated by the solid unfilled circles.

Similarly, distinctions in nodes close to the one-dimensional portion (412) are also intended to have a high resolution. For example, the interpolated nodes (309-5) that are closer to the higher resolution one-dimensional nodes (309-4, hatched) are influenced by those higher resolution one-dimensional nodes (309-4, hatched) and thus their accuracy is improved due to the effect of interpolation from a non-interpolated node (309-4) as opposed to interpolation from an interpolated node (309-5). The interpolated nodes (309-5) that are influenced by the higher resolution one-dimensional nodes (309-4, hatched) are indicated as dashed circles having a vertical hatching. As can be seen, by using the higher resolution portion for interpolation, increased accuracy may be acquired in areas around the higher resolution portion thereby increasing the accuracy of interpolation near the higher resolution portion, thereby increasing the accuracy, or overall quality, of the compressed color table (105).

FIG. 7 is a diagram of a printer cartridge (103) with a memory device (204) containing a pointer (714) to a compressed multi-dimensional color table (105), according to one example of the principles described herein. As described above, in some examples the color table (105) is independent of the memory device (204). For example, the color table (105) may be located remotely from the printer cartridge (103) and may be accessed remotely, such as via an internet connection. In this example, the compressed multi-dimensional color table (105) may be accessed by a pointer (714) on the memory device (204) located on the printer cartridge (103). An example of such a remote access is given as follows.

In this example, the printer cartridge (103) with the corresponding memory device (204) is installed in an output device (FIG. 1, 102) such as a printer. A pointer (714) such as a unique identifier is read from the memory device (204), which uniquely identifies the color table (105) as it is stored remotely. The output device (FIG. 1, 102) or a controller on the output device (FIG. 1, 102) looks up the color tables (105) associated with the unique identifier and transmits the color tables (105) to the output device (FIG. 1, 102) where they are authenticated, via a digital signature for example, then stored in dynamic memory or in non-volatile memory associated with the output device (FIG. 1, 102) or printer cartridge (FIG. 1, 103) and associated memory device (204). A number of the operations described above may be performed by the output device (FIG. 1, 102), an associated controller or a remote service provider such as an internet service. Additional operations may occur such as authenticating the printer cartridge and authenticating the printer to the remote service and authenticating the compressed color tables to the printer.

Certain examples of the present disclosure are directed to a printer cartridge (FIG. 1, 103) and a memory device (FIG. 2, 204) that include compressed multi-dimensional color tables (FIG. 1, 105) that provide a number of advantages not previously offered including (1) storing color transformation information using little memory storage space on a printer cartridge (FIG. 1, 103); (2) maintaining color transformation integrity for easily distinguishable color transformations; (3) offering improved ink types that didn't exist at the time the original product was manufactured; (4) correcting color tables in printers after start of manufacturing of an output device (FIG. 1, 102); (5) correcting color tables for changes in media; (6) supporting media types that didn't exist at the time an output device (FIG. 1, 102) was manufactured; (7) introducing output media with different color characteristics without requiring the customer to replace all supplies to correct for errors; and (8) introducing improved color tables for a single color without requiring the customer to replace all supplies to correct for errors. However, it is contemplated that the devices and methods disclosed herein may prove useful in addressing other deficiencies in a number of technical areas. Therefore the systems and devices disclosed herein should not be construed as addressing just the particular elements or deficiencies discussed herein.

The preceding description has been presented to illustrate and describe examples of the principles described. This description is not intended to be exhaustive or to limit these principles to any precise form disclosed. Many modifications and variations are possible in light of the above teaching.

What is claimed is:

1. A cartridge set comprising a plurality of printer cartridges comprising:
   multiple printer cartridges, each cartridge comprising:
   a memory device including a number of compressed multi-dimensional color tables to be used with a printer to convert an input color model into an output color model, wherein:
   different compressed multi-dimensional color tables of the number of compressed multi-dimensional color tables correspond to different media types:and
   each compressed multi-dimensional color table comprises:
      at least one low dimensional portion of each multi-dimensional color table having a number of dimensions that is less than the number of dimensions of the multi-dimensional color table, the at least one low dimensional portion including color transformation information at a first resolution; and
      a number of remaining portions of each multi-dimensional color table which are those portions which are not defined by the at least one low dimensional portion, the remaining portions including color transformation information at a second resolution;
      in which the at least one low dimensional portion and the number of remaining portions are interpolated to generate a high resolution uncompressed multi-dimensional color table, the high resolution being at least as great as the first resolution;
   wherein:
      the multiple cartridges comprises each of a black ink cartridge, a cyan ink cartridge, a magenta ink cartridge, and a yellow ink cartridge; and
      the memory devices of each of the multiple cartridges contains compressed color tables corresponding to the ink color in the cartridge.

2. The cartridge set of claim 1, in which the at least one low dimensional portion is defined by no more than two dimensions.

3. The cartridge set of claim 1, in which the number of compressed multi-dimensional color tables comprise a number of node addresses to individually address nodes within the compressed multi-dimensional color table.

4. The cartridge set of claim 1, in which the number of compressed multi-dimensional color tables stored on the memory device further comprise additional low dimensional portions of the multi-dimensional color table storing color transformation information at the first resolution.

5. The cartridge set of claim 1, wherein the at least one low dimensional portion of the multi-dimensional color table is the same as at least one low dimensional portion in a multi-dimensional color table of another printer cartridge.

6. The cartridge set of claim 1, wherein each printer cartridge is a three-dimensional printer cartridge for three-dimensional printing.

7. The cartridge set of claim 1, in which the at least one low dimensional portion that stores color transformation information includes color transformation information for neutral colors.

8. The cartridge set of claim 1, in which the at least one low dimensional portion that stores color transformation information includes color transformation information for colors having larger color differences relative to the remaining portions as measured by a color difference metric.

9. The cartridge set of claim 1, wherein the third resolution is the same as one of the first resolution and the second resolution.

10. The cartridge set of claim 1, wherein each compressed multi-dimensional color table comprises a third number of nodes along an intermediate portion of each multi-dimensional color table including color transformation information at a third resolution, in which the remaining portions comprise those portions not comprising the low dimensional portion and the intermediate portion.

11. The cartridge set of claim 1, wherein the at least one low dimensional portion of the multi-dimensional color table of one of the plurality cartridges is the same as at least one low dimensional portion in a multi-dimensional color table of another of the plurality of printer cartridges.

12. A cartridge set comprising a plurality of printer cartridges, comprising:
   multiple printer cartridges, each cartridge comprising:
   a memory device including a number of compressed multi-dimensional color tables to be used with a printer to convert an input color model into an output color model, wherein:
   different compressed multi-dimensional color tables of the number of compressed multi-dimensional color tables correspond to different media types: and
   each compressed multi-dimensional color table comprises:
      a first number of nodes along a low dimensional portion of each multi-dimensional color table having a number of dimensions that is less than the number of dimensions of the multi-dimensional color table, the first number of nodes including color transformation information at a first resolution;
      a second number of nodes along a number of remaining portions of each multi-dimensional color table which are those portions which are not defined by the at least one low dimensional portion, the second number of nodes storing color transformation information at a second resolution; and
      a third number of nodes along an intermediate portion of each multi-dimensional color table including color transformation information at a third resolution, in which the remaining portions comprise those portions not comprising the low dimensional portion and the intermediate portion;
      in which the low dimensional portion and the number of remaining portions are interpolated to generate a high resolution uncompressed multi-dimensional color table, the high resolution being at least as great as the first resolution:

wherein:
the multiple cartridges comprises each of a black ink cartridge, a cyan ink cartridge, a magenta ink cartridge, and a yellow ink cartridge; and
the memory devices of each of the multiple cartridges contains compressed color tables corresponding to the ink color in the cartridge.

13. The cartridge set of claim 12, wherein the high resolution is at least as great as the highest of the first resolution and the third resolution.

14. A memory device comprising:
a number of compressed multi-dimensional color to be used with a printer to convert an input color model into an output color model, wherein
different compressed multi-dimensional color tables of the number of compressed multi-dimensional color tables correspond to different media types; and
each compressed multi-dimensional color table comprises:
at least one low dimensional portion of each multi-dimensional color table having a number of dimensions that is less than the number of dimensions of the multi-dimensional color table at least one low dimensional portion including color transformation information at a first resolution; and
a number of remaining portions of each multi-dimensional color table which are those portions which are not defined by the at least one low dimensional portion, the remaining portions including color transformation information at a second resolution;
in which the low dimensional portion and the number of remaining portions are interpolated to generate a high resolution uncompressed multi-dimensional color table, the high resolution being at least as great as the first resolution:
wherein the memory device contains compressed color tables corresponding to an ink color in a cartridge in which the memory device is disposed.

15. The memory device of claim 14, wherein the each compressed multi-dimensional color table is a pointer in the memory device.

16. The memory device of claim 15, wherein the pointer identifies a remote location of the compressed-multi-dimensional color table.

17. The memory device of claim 14, wherein the at least one low dimensional portion of the multi-dimensional color table is digitally losslessly compressed.

18. The memory device of claim 14, wherein the number of remaining portions include color transformation information at a five node resolution, excluding redundant nodes on the neutral axis.

19. The memory device of claim 14, wherein the neutral axis and the at least one of an additional axis and an additional plane have larger color differences between node pairs as compared to the remaining portions as measured at equal resolution by a color difference metric.

* * * * *